Sept. 29, 1964     D. COSTES     3,150,688
CONTROL VALVE OPERATING MECHANISM
Filed Aug. 6, 1962     2 Sheets-Sheet 1
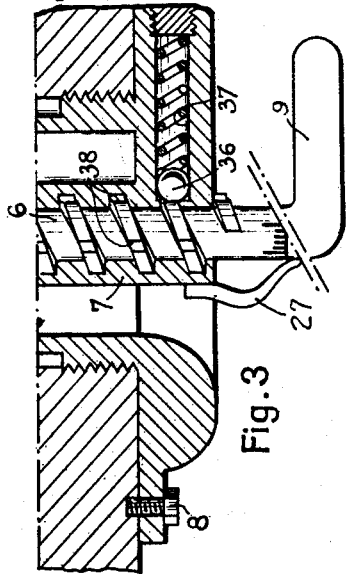
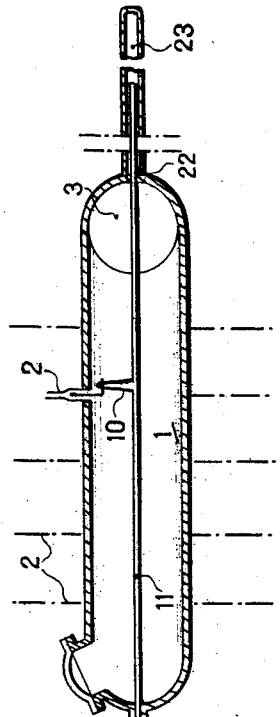
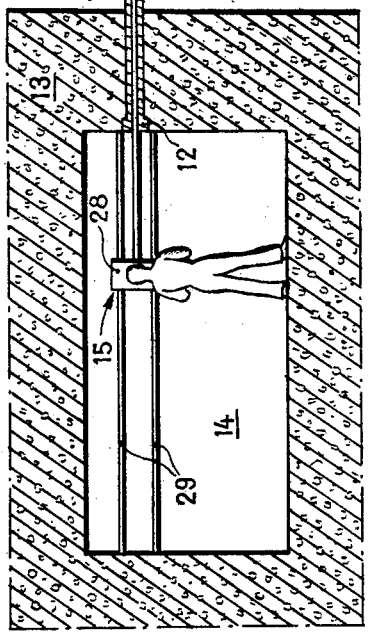
INVENTOR
BY
ATTORNEY

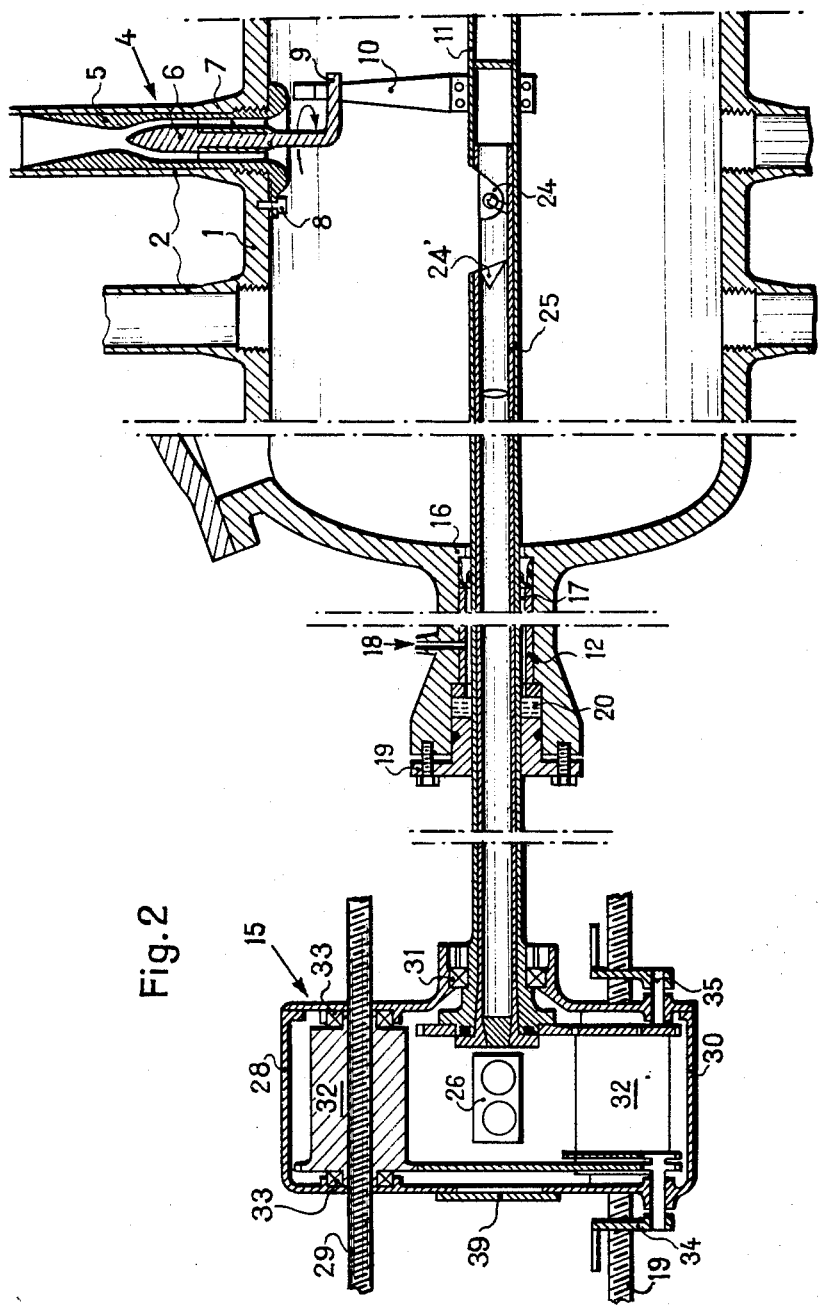

United States Patent Office 3,150,688
Patented Sept. 29, 1964

3,150,688
CONTROL VALVE OPERATING MECHANISM
Didier Costes, Paris, France, assignor to Commissariat
a l'Energie Atomique
Filed Aug. 6, 1962, Ser. No. 214,891
Claims priority, application France, Aug. 18, 1961,
871,057
8 Claims. (Cl. 137—635)

The invention relates to valve operating devices and more particularly to a centralized device for operating adjustable valves particularly, though not exclusively, adapted for use with fluid-pressure systems comprising a large number of conduits in which the individual flow rates should be adjustable during operation.

An important application of the invention relates to control of the flow of a cooling fluid in nuclear reactors: The stringent requirements for protection in this field of use increase the advantages of a centralized control system over individual control systems.

The usual solution for regulating the individual flows in a large number of conduits consists in providing each conduit with a separate valve controlled by means of an individual linkage. When the valves are intended to regulate the flow of a cooling fluid in a nuclear reactor, they should have a high standard of sealing (insured for example by a bellows) and should be controlled by a linkage projecting out of a biological protection screen. This device is costly and cumbersome when the number of valves runs into several hundreds.

An overall object of the invention is to overcome the drawbacks of prior art valve operating devices.

It is a more specific object of the invention to provide a centralized control device adapted to operate a large number of valves and including a single fluid-tight connection between the device and the enclosure under pressure and the biological protection screen.

The device according to the invention, for the centralized control of a plurality of adjustable valves, located at the outlets of conduits into a collector, arranged substantially on a cylinder of revolution and each comprising an adjustment member which is rotatable around a radially directed axis, comprises a shaft arranged along the axis of the cylinder, means for supporting the shaft in rotation and in translation, a control pin carried by the shaft and adapted to engage said adjustment members, and means for causing the shaft to move in rotation and translation so that the transverse pin has a tacking movement around a median position, whereby the adjustment member of any one of the valves may be rotated.

In order that the invention may be more clearly understood, reference will now be made to the accompanying drawings which show one embodiment thereof by way of example and in which:

FIGURE 1 shows a diagrammatic cross-sectional view through a collector provided with outlets, each of which is fitted with a valve, and a centralized control device associated therewith, FIGURE 2 shows a detailed cross-sectional view, diagrammatically illustrating the control device engaging with a valve, and FIGURE 3 is an enlarged cross-sectional view, diagrammatically illustrating a valve provided with a resilient locking mechanism.

In FIGURE 1 of the drawings, there is illustrated a collector 1 provided with delivery conduits 2, one only of which is shown in full lines, the other being indicated by chain-dotted lines, and a guide sleeve 3. The use of the term "delivery" should not be construed as a limitation regarding the direction of flow, since the liquid may equally well flow in the conduits towards the collector.

When the device of the invention is embodied in a nuclear reactor for controlling the flow of a cooling fluid therein, the valves are preferably located at the outlet from the low-temperature header from which the fluid flows toward the reactor core, since the liquid is then throttled at the point wherein its temperature is lowest.

Each delivery conduit is provided with a valve 4, as will be seen in FIGURE 2. Each valve has an adjustment member, and all the members are located along the periphery of a cylinder of revolution so as to facilitate the control thereof, although the header itself may or not have a shape which is a figure of revolution.

As shown in FIGURES 2 and 3, the valve axis is directed toward the axis of the header and the control member is threadedly received in the valve body. However the invention is not limited to a valve of this type.

The valve illustrated in FIGURES 2 and 3 comprises a valve body 5 secured to the delivery conduit by any suitable means such as a threaded connection and a needle 6 screw-threaded into a hub 7 fast with the header 1 and body 5. The hub 7 may be integral with the body 5 and the assembly may be screwed into the outlet conduit and locked by a conventional stop member such as a screw 8 (FIG. 2). The threaded needle 6 is provided with a lateral lug 9 adapted to be engaged by a pin 10 for rotating the needle.

The pin 10 is secured to a tubular shaft 11 which projects out of the header through a sliding and rotating seal 12 and through a biological protection shield 13 into a control chamber 14 (FIGURE 1). The end part of the shaft 11 supports a control mechanism 15, hereinafter to be described.

The sealing structure 12 comprises a primary lip joint 16 separating the header and a chamber 17 and a secondary joint, for instance of the stuffing box type, separating the chamber 17 and the atmosphere. A line 18 delivers purified cold cooling liquid to the chamber 17 under a pressure slightly in excess of that in the header so that the leaks at joint 16, if any, result in a flow from the chamber toward the header 1. The secondary joint comprises a sealing element 20 and a clamping sleeve 19.

The tubular shaft 11 is preferably arranged so that the pressure forces acting thereon are balanced. For this purpose, the free end portion of the shaft may project through a sealing structure 22 out of the header, in a tube 23 from which leaking fluid is scavenged for maintaining atmospheric pressure (FIGURE 1) in the tube. It is also possible to apply a suitable axial force on the control mechanism by means of a conventional device which may or may not use the pressure of the cooling fluid.

Intermediate bearings, not illustrated, slotted in order to allow the operating pin 10 to pass therethrough, may be arranged in the collector 1 in order to support the tubular shaft 11.

An illuminating device 24 and an inspection or endoscope device 24' may be so arranged in the shaft 11 that the field of view covers the end portion of the pin 10 and the rotative needle 6. These two devices are located in an internal removable tube 25, slidably received in shaft 11.

Provided that suitable sealing means are designed, the complete internal tube may be renewed without depressuring the header and dismantling the tubular shaft. The lighting device may of course be independent of the sliding assembly.

The position of each valve adjustment member may be viewed through the endoscope provided with eye pieces 26. For maximum operative facilities, reference marks may be provided on the needle 6 for moving in front of a fixed index 27 (FIGURE 3).

The control mechanism, designated as a whole by reference numeral 15 comprises a movable assembly 28 mounted on two stationary threaded rods 29 arranged in the control chamber 14. The assembly 28 comprises a casing 30 rotatably connected to shaft 11 by a thrust bearing 31. A nut 32 is screwed onto each rod 29, and is rotatably connected to casing 30 by thrust bearings 33. The nuts are preferably of the ball circulation type in order to reduce friction. Each nut 32 is driven, for example through a conventional chain, by a handle 34 carried by the casing 30. Rotation of the handle 34 causes the nuts to rotate and the movable assembly 28 to move axially along the threaded rods 29. A servo-motor may be inserted between the handle and the bolts, as will readily be understood.

The end part of the shaft 11 is driven in rotation by a second handle 35, through a gearing for example. Rotation of the handle 35 causes the shaft and the pin 10 to rotate. A servo-motor may also be inserted between the handle and the shaft 11.

Any other conventional means may be used to ensure the translation and rotation of shaft 11.

By properly synchronising the movement of the handles, it is possible for the operator facing the movable system and watching through the eye pieces 26, to displace the pin 10 along any given path; in particular he may screw and unscrew the needle 6 in the hub 7 by causing the pin 10 to assume a tacking movement around the axis of the needle 6.

Locking means may be provided for preventing vibrations from modifying the adjustment of the valve when the operating pin 10 has left the valve 4 in a given position. The device illustrated in FIGURE 3 may be used to resiliently lock the valve. This device comprises a ball 36 slidably received in a bore 37 of the body 5 and forced by a spring against the thread of the needle 6 provided with longitudinal grooves 38.

The handle control and the endoscope observation ensure excellent safety for the operator with a relatively simple device: the use of an endoscope designed for lateral view enables the operator to be located on the side of the movable assembly thereby protecting him against any sudden recoil of the shaft.

An aperture 39 is provided in the casing 30 for removal of the endoscope 2; the removal may be effected without depressuring the header if a suitable sealing device is provided on the shaft. For example, shaft 11 may be pulled from the header until the lip joint 16 extends beyond the aperture provided in the shaft 11 for the endoscope. The lateral wall of this aperture should obviously be so cut as not to present an acute angle with the shaft surface.

Among other qualities, the device hereinbefore described is simple in design and safe in operation due to the presence of a single joint: it has great flexibility of use since it enables valves arranged on divergent outlets to be controlled. Moreover, it is in no way necessary that the valves should be along two opposed generatrixes of the header only, as shown in FIGURE 1: Six or eight valves may be easily provided in each cross-section.

Although only one embodiment of the invention has been described and illustrated, it should be understood that equivalent mechanical arrangements may be used as desired, without departing from the scope of the following claims.

I claim:

1. In a control valve operating mechanism for control of a plurality of adjustable valves each communicating with a vessel and each having an adjustment member rotatable about a direction radial to an axis of said vessel, a shaft arranged along the axis of said vessel, means for slidably and rotatably supporting said shaft, control means carried by said shaft, said control means projecting radially from said shaft and being adapted for operative engagement with the adjustment member of any one of said valves, and operator operated means for reciprocating and rotating said shaft, whereby said control means may be moved around the radial direction of any one of said valves along a substantially circular path for rotating the adjustment member of the valve, wherein the shaft has an end portion which projects outside the vessel and said operator operated means comprises a trolley connected in translation to said shaft and first and second control means provided to reciprocate the trolley and to rotate the shaft with respect to the trolley, respectively.

2. An operating mechanism as claimed in claim 1, wherein the means for axially displacing the trolley comprises two helical connection devices, each having a stationary threaded rod and a nut rotatably nonslidably connected to the shaft and operatively connecting said first control means to said nut.

3. A operating mechanism as claimed in claim 1, wherein the means for rotating the shaft with respect to the trolley comprises a gearing operatively connecting the shaft to second control means carried by the trolley.

4. An operating mechanism as claimed in claim 1, wherein both end portions of said shaft project outside the vessel and means are provided for subjecting both ends to the same fluid pressure, whereby the pressure forces on the shaft are balanced.

5. An operating mechanism as claimed in claim 1, wherein the shaft is tubular and slidably locates an axially arranged endoscope, the field of view of which includes said control means mounted on the shaft and the valve operated by said control means.

6. An operating mechanism as claimed in claim 5, having sealing means between the endoscope and the cylindrical shaft and between the shaft and the collector whereby the endoscope may be removed.

7. In a control valve operating mechanism for control of a plurality of adjustable valves each communicating with a vessel and each having an adjustment member rotatable about a direction radial to an axis of said vessel, a shaft arranged along the axis of said vessel, means for slidably and rotatably supporting said shaft, control means carried by said shaft, said control means projecting radially from said shaft and being adapted for operative engagement with the adjustment member of any one of said valves, and operator operated means for reciprocating and rotating said shaft, whereby said control means may be moved around the radial direction of any one of said valves along a substantially circular path for rotating the adjustment member of the valves, wherein each adjustment member is provided with an operating lug and has a threaded connection with a fixed body, rotation of the lug by said control means resulting in screwing movement of the adjustment member.

8. An operating mechanism as claimed in claim 7, wherein each valve is provided with a resilient locking device for locking the adjustment member against rotation outside the periods when it is actuated by said control means.

References Cited in the file of this patent
UNITED STATES PATENTS

| | | |
|---|---|---|
| 968,445 | Brown | Aug. 23, 1910 |
| 1,240,426 | Doman | Sept. 18, 1917 |